United States Patent [19]
Decker et al.

[11] Patent Number: 5,525,310
[45] Date of Patent: Jun. 11, 1996

[54] CONTINUOUS CORONA DISCHARGE OZONE GENERATION DEVICE

[76] Inventors: R. Scott Decker, HCR1 Box 16A9, Aurora, Mo. 65605; Roger A. Gliedt, 1306 Sycamore; Richard Wise, 601 Hwy. 60, both of Monett, Mo. 65708

[21] Appl. No.: 510,355

[22] Filed: Aug. 2, 1995

[51] Int. Cl.[6] .................................................. B01J 19/12
[52] U.S. Cl. .............................. 422/189.07; 422/907
[58] Field of Search ............... 422/186.07, 907

[56] References Cited

U.S. PATENT DOCUMENTS

| | | | |
|---|---|---|---|
| 3,081,215 | 3/1963 | Held et al. | 156/286 |
| 3,215,616 | 11/1965 | Spielman | 204/313 |
| 3,309,304 | 3/1967 | Caplan | 204/313 |
| 3,457,160 | 7/1969 | Fortier | 204/319 |
| 3,607,709 | 9/1971 | Rice | 204/317 |
| 3,838,290 | 9/1974 | Crooks | 250/532 |
| 3,875,035 | 4/1975 | Lowther | 204/176 |
| 3,903,426 | 9/1975 | Lowther | 250/532 |
| 4,818,498 | 4/1989 | Bachhofer et al. | 422/186.2 |
| 5,087,428 | 2/1992 | Fletcher et al. | 422/186.07 |

*Primary Examiner*—Donald P. Walsh
*Assistant Examiner*—Daniel Jenkins
*Attorney, Agent, or Firm*—Richard P. Stitt

[57] ABSTRACT

An ozone generator providing an air-cooled reduced voltage corona discharge generation unit which avoids decomposition upon ozone generation and permits a high ratio of ozone output per ampere of electricity introduced.

7 Claims, 2 Drawing Sheets

5,525,310

CONTINUOUS CORONA DISCHARGE OZONE GENERATION DEVICE

BACKGROUND OF THE INVENTION

This invention relates to the generation of ozone for various industrial applications and in particular to an improved corona discharge type of ozone generator capable of providing high ozone output while using lower voltage input as compared to conventional generators and with significantly lower energy consumption.

Ozone $O_3$ is a blue gas consisting of three oxygen atoms and having a characteristic, pungent odor. Ozone is formed when ordinary molecular oxygen is subjected to electrostatic discharge. Ozone has a density 1.5 times that of oxygen and is explosive by percussion or under variations of pressure.

Ozone is used as a bleaching agent, as an oxidizing agent and commonly as a disinfectant for air and water solutions. Odor- and taste-producing hydrocarbons can be effectively eliminated by ozone oxidation. Iron and manganese compounds which discolor water are diminished by introduction of ozone. Ozone presents several advantages over chlorine for bacterial and viral disinfection of water. Ozone is up to 5000 times more rapid in its action than chlorine, and after ozone treatment there is not the undesirable taste and odor which is associated with chlorine treatment. Also, chlorine treatment can introduce various chlorine compounds to water such as chloroform and trihalomethane compounds which are potentially carcinogenic.

Corona discharge devices for production of ozone have been in use for sometime. The principle forms of corona discharge devices include solid plate-type generators and tube discharge type generators. Ozone generators are constructed in the general form of a "sandwich" consisting of a conductor layer—dielectric layer—conductor layer with the conductors being solid metallic plates. This sandwich may then be used as a flat unit which is commonly referred to as a "plate-type" ozone generator, or alternatively, the opposing edges of the sandwich may be brought into contact to form a cylinder of the sandwich. The cylinder form is referred to as a tube-type generator.

Temperature control is a critical aspect of ozone production. The temperature of the dielectric elements at the site of corona formation must be controlled as ozone output will vary as a function of generator temperature. In addition, excessive temperatures will affect the dielectric material itself causing changes in the thermal characteristics of the dielectric material and possible breakage of the dielectric.

As a result of the need for temperature control, tube-type generators are the most common generator style as they can provide higher ozone production rates due in large part to the ability to configure a water jacket about the electrical discharge area to provide cooling of the unit. Heretofore, air-cooled ozone generators have presented the disadvantage of poor temperature control. Since the critical temperatures for ozone generator dielectrics are in the range of 120° F. to 130° F., it is difficult to balance sufficient air flow through the generator for cooling with the lower air flow needed to permit the $O_2$ to $O_3$ reaction to occur. The one option for dealing with this problem is to utilize refrigerated air to cool the generator. However, once the expense of air-cooling equipment is included the initial lower air-cooled system cost is in the range of water cooled systems. Therefore, the commonly used method of ozone generator cooling is water or chilled water, contained in a water jacket, which surrounds a tube-type corona discharge portion of the generator.

It will be appreciated that this use of water to cool the ozone generator adds substantially to unit cost and unit operation cost. Also the use of water flow cooling requires the availability of a water source and reduces the portability of the generator. At best, if portability is desired, water cooling requires the addition of a self-contained water circulation and water refrigeration system which adds substantially to the cost of the device. These mobility limitations of water cooled devices limit their utility to fixed location applications such as water system purification.

As ozone increasingly becomes the method of choice for deodorizing motel and hotel rooms and used automobiles and private homes, the burden of water cooling cost and lack of mobility presents a substantial limitation on the application of ozone for these purposes. This problem is further compounded by in ability of previous air-cooled ozone generators to provide sufficient ozone production to accomplish these deodorizing tasks in a reasonable amount of time.

Another limitation of prior ozone generators of all types is that they require the application of very high voltages. Voltages on the order of 5,000 to 25,000 volts are commonly used in present ozone generators with power consumption ranging from 3.5 amps to produce 0.84 lbs $O_3$ per day to 5 amps to produce 2.0 lbs $O_3$ per day. This, respectively, represents 0.24 lbs/amp and 0.28 lbs/amp.

The present invention provides a portable ozone generator which avoids the need to water cool the generator and while solving the problems of inefficient air-cooling and low $O_3$ production per unit of power consumption and ozone deterioration of the generation unit itself.

SUMMARY OF THE INVENTION

Therefore, it is a principal object of the present invention to provide increased ozone output per unit of consumed power from an air-cooled corona discharge ozone generator while utilizing reduced voltage for corona generation.

It is another object of the present invention to provide an ozone generator while avoiding the use of ozone generation chamber parts and adhesives, which are subject to attack by produced ozone, for permanently mounting conductors to the dielectrics.

Another object of the present invention is to provide corona discharge proximate to a dielectric through spring biasing of a wire mesh conductor against a dielectric and thereby avoiding the use of adhesives which degrade under ozone attack and disrupt ozone generation.

Yet another object of the present invention is to provide a corona discharge ozone generator having ozone-resistant power cables and power cable entrance and exit ports which compressively capture the power cables to maintain isolation of the ozone generation chamber.

The foregoing and other objects are not meant in a limiting sense, and will be readily evident upon a study of the following specification and accompanying drawings comprising a pan thereof and wherein a corona discharge ozone generator is presented which secures in spring-biased manner a plurality of positively charged wire mesh void-containing electrodes and a plurality of negatively charged wire mesh void-containing electrodes in alternating order against opposing sides of a plurality of dielectric plates for generation of corona discharge.

DETAILED DESCRIPTION OF THE PREFERRED EMBODIMENTS

Figure 1:
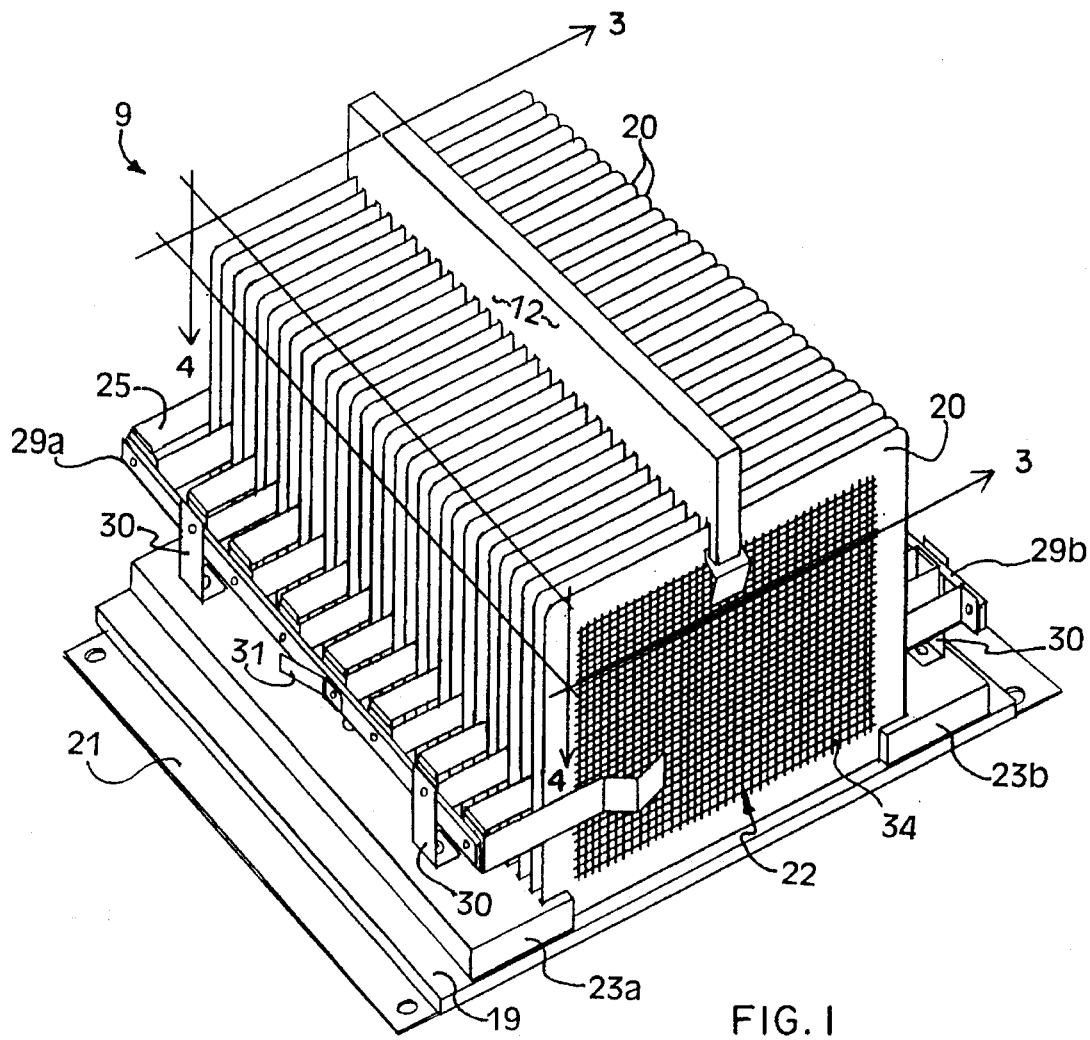
FIG. 1 is a top and left side perspective view of the corona discharge cell assembly of the present invention showing the positioning of the dielectric plates within the locator block and the spacing of the top of the plates by the chamber segregation plate which also serves to divide the generation chamber into two sections.
Figure 2:
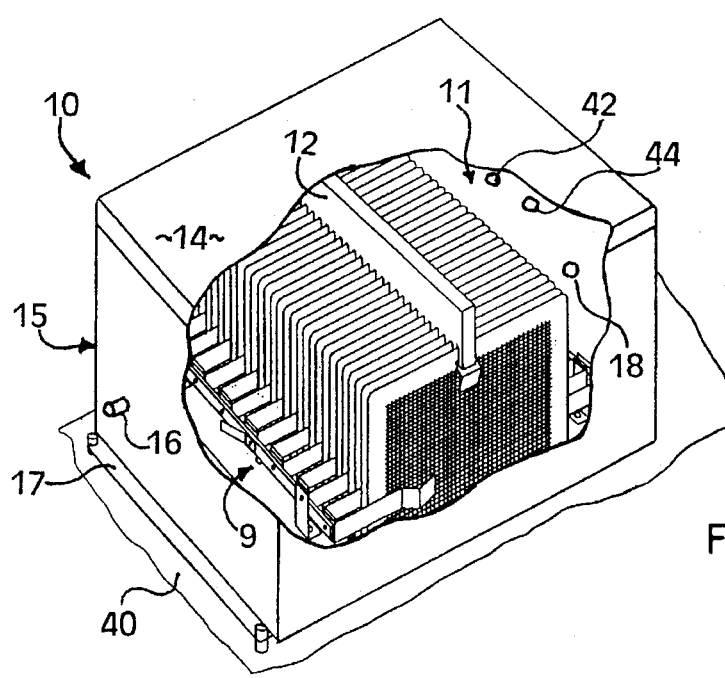
FIG. 2 is a top and left side perspective view of the corona discharge assembly mounted within the generation chamber and having a portion of the chamber top and front wall and left side wall removed to reveal the close contact of the segregation plate with the top of the chamber.

First referring to FIG. 2, corona discharge ozone generating device 10 is shown with exterior container 15 partially removed to allow observation of ozone generation chamber 11 containing ozone generation cell 9 (FIG. 1). Stainless steel container 15 is provided with gas entry port 16 on a first sidewall, and gas exit port 18 on a second opposite sidewall from entry port 16. Ozone generation cell 9 is oriented within container 15 so gas flow is parallel to the faces of dielectric plates 20 (FIG. 1) and the stainless steel wire mesh grid electrodes 22 (FIG. 1 ). Container 15 is attached to securing plate 17 for convenience in mounting the container to support structure 40. A transformer for any necessary conversion of electrical power to meet the requirements of ozone generating device 10 also can be attached to structure 40.

Still referring to FIG. 2, generation chamber 11 is separated into two sections. A first portion near gas entry port 16 and a second portion near gas exit port 18. This division of generation chamber 11 is further defined by segregation baffle 12 which extends upwardly from the top of cell 9 to contact the top of container 15 at lid 14. Segregation baffle 12 serves to direct the flow of input gas through cell 9 for reaction and to prevent gas flow over the top of cell 9 which would reduce cell efficiency. Segregation baffle also prevents gas which has passed through cell 9 from flowing back over the top of cell 9 and assists in maintaining the fixed separation of dielectric plates 20.

Referring now to FIG. 1, the construction of ozone generation cell 9 will be discussed. Cell 9 is composed, generally, of a series of stainless steel wire mesh grid electrodes 22 which are in contact with ceramic dielectric plates 20. Grids 22 and plates 20 are particularly sized to maximize efficiency of ozone production with respect to the amount of power introduced into cell 9 and to minimize the generation of heat so as to permit air cooling of the apparatus by the gas introduced into chamber 11 through gas inlet 16.

While stainless steel grids 22 and dielectric plates 20 could, in theory, be of any size and produce ozone, a substantial reduction in the efficiency of cell 9 has been detected as the dimensions of grids 22 and plates 20 increase. This reduction in efficiency is believed to be due to the increase in the amount of heat produced as the size of ozone generation cell 9 increases. This additional production of heat exceeds the capacity of the input gas to function to air-cool cell 9 and results in the loss of production efficiency.

In a preferred embodiment it has been found that sizing stainless steel wire mesh grids 22 to 3.5 inches by 3.5 inches (12.25 square inches) and sizing ceramic dielectric plates 20 to 4.5 inches by 4.5 inches (20.25 square inches) produces the greatest efficiency of ozone production. Ceramic dielectric plate 20 is composed of 96% alumina oxide ($Al_2O_3$). One such suitable ceramic material is RUBALIT ® 710 manufactured by HOECHST. Ceramic dielectric plates 20 are provided with curved corners. A square corner can be utilized on plates 20, however, a reduction in the efficiency of ozone production accompanies the square corner configuration of plate 20. This drop in ozone production is believed to be due to the additional ceramic area presented by the square corner which interferes with gas flow through cell 9.

The thickness of ceramic dielectric plates 20 also is of critical importance to efficient production of ozone in cell 9. A preferred embodiment of cell 9 utilizes ceramic plates of 0.040 inches thickness. It has been observed that a reduction or increase in the thickness of plate 20 from 0.040 inches results in a reduction of ozone output. As the thickness of plate 20 is reduced from 0.040 inches ozone output is reduced with a substantial loss of output when plate 20 thickness is reduced below 0.020 inches. An increase in thickness of plate 20 from 0.040 inches also reduces the production of ozone. As plate 20 thickness approaches 0.080 inches, a 50% reduction in ozone production has been observed. While glass or mica could be substituted for ceramic in the present inventive combination, both are extremely fragile and can break under the pressure provided by spring clips 25 (FIG. 1) which hold mesh grid electrodes 22 in position.

Wire mesh grid electrodes 22 are formed of stainless steel to minimize oxidative attack of the grids 22 by the generated ozone. Grids 22 are a waffle-like, cross-hatch pattern of approximately 22 gauge stainless steel wire providing square screen voids 34 of approximately 1 millimeter length on each side of void 34. It is within these voids and adjacent to surface of dielectric plates 20 that corona formation occurs thereby providing the reaction site for $O_2$ breakdown and $O_3$ formation.

Still referring to FIG. 1, grids 22 are centered on plates 20. During assembly of cell 9, grids 22 are initially affixed to plates 20 by the use of a small amount of silicon rubber adhesive. The adhesive holds grid 22 onto plate 20 to permit completion of cell 9 assembly. However, during operation, the silicon adhesive decomposes to a fine white powder within 30 days of the initiation of operation under the oxidative strength of the generated ozone. This decomposition of the silicone rubber adhesive is representative of an entire range of problems presented in the design of an ozone generator; the product produced, ozone, tends to oxidize all but the strongest of materials. This decomposition of adhesive would result in grids 22 separating from dielectric plates 20 as the adhesive fails. As grids 22 become separated from plates 20 the efficiency of cell 9 is reduced or lost completely.

This problem has been overcome in the present invention by providing power leads for grids 22 in the form of spring clips 25. Clips 25 spring bias grids 22 against plates 20 thereby holding grids 22 securely in place after the silicon adhesive has fully decomposed under ozone oxidation.

Figure 3:
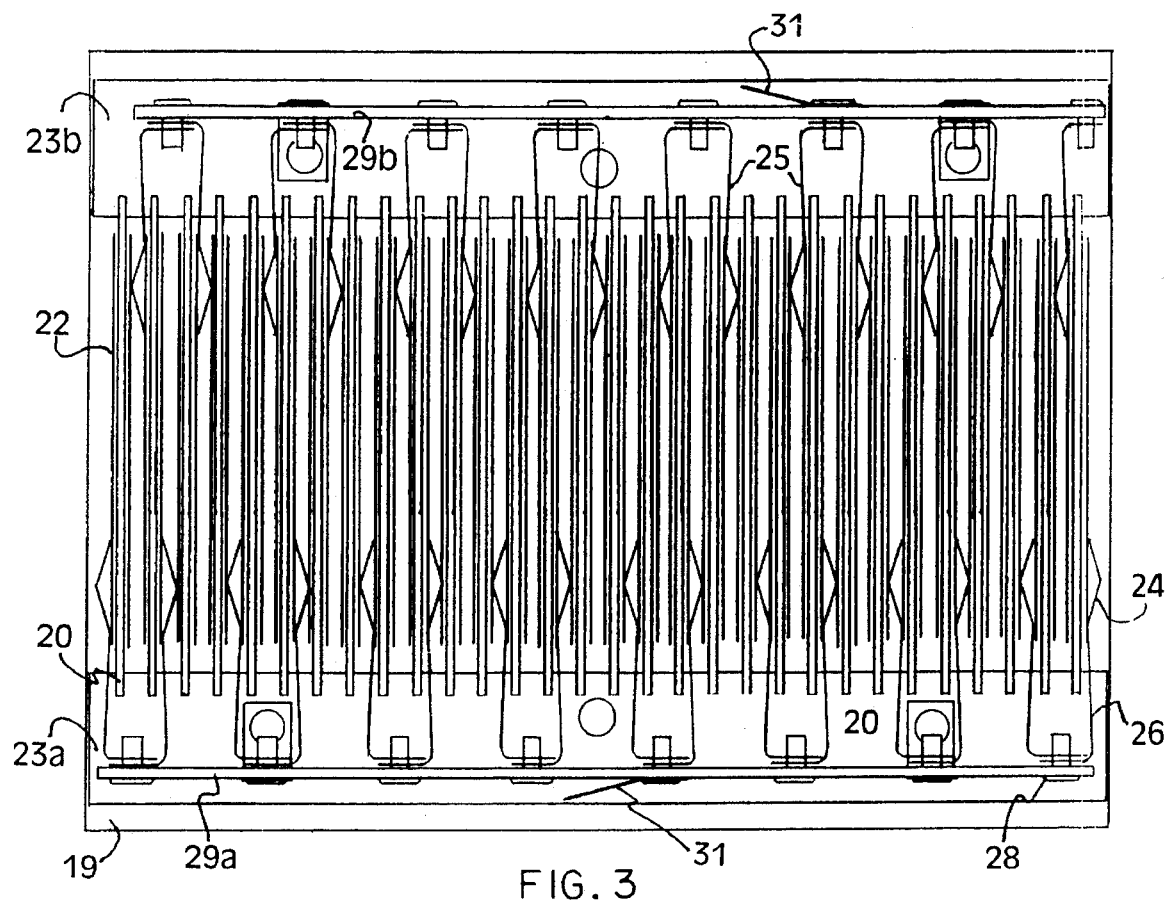
FIG. 3 is cross-sectional view taken along line 3—3 of FIG. 1 and showing the positioning of the dielectric plates within the locator blocks and the positive and negative power bus bars having spring clips attached thereto and the positioning of the clips for spring biasing of the corona discharge mesh grids against the dielectric plates.

Referring now to FIG. 3, spring clips 25 are composed of stainless steel and shaped to provide an arm 26 at one end for connection to power bus 29a, 29b and with a generally "V" shaped bend 24 at the other end for securing grids 22 to plates 20. A stainless steel rivet 28 is used to secure arm 26 of spring clip 25 to bus bar 29a, 29b. The "V" shaping of the end permits two grids 22 to be held against opposing, spaced apart plates 20 while providing electrical current to both grids. The legs of "V" bend 24 secure a first grid 22 to a first plate 20 and the bend or bottom of the "V" operates to hold a second grid 22 against a second, adjacent plate 20. In this manner mesh grids 22 are held in place on dielectric plates 20 after the decomposition of the silicon rubber adhesive.

Figure 4:
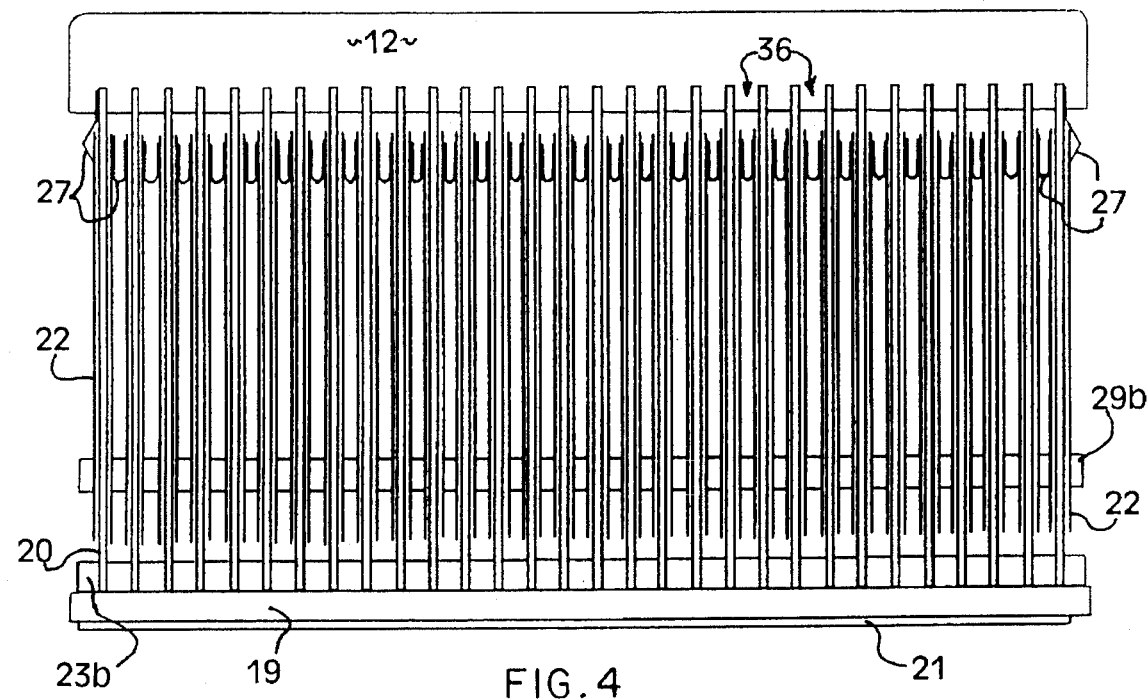
FIG. 4 is cross-sectional view taken along line 4—4 of FIG. 1 and showing the alignment of the locator blocks with the segregation plate and the U-shaped grid retainers for holding the upper margin of the grids in place. The conductive spring clips have been removed for clarity.

Referring to FIG. 4, the positioning of plates 20 is shown. Dielectric plates 20, having grids 22 thereon, are spaced apart at intervals. Plates 20 are secured at the bottom edge by insertion into locator blocks 23a, 23b (FIG. 1). Locator blocks 23a, 23b are composed of KYNAR ® a product of Elf Atochem Noah America, Inc., which is a polyvinylfluoro polymer and highly resistant to ozone oxidation. Each locator block 23a, 23b is notched at intervals to provide face-to-face separation 36 between plates 20 of 0.250 inches to allow gas flow between plates 20. The notches of block 23a are positioned directly opposite the notches of 23b to permit insertion of plates 20 therein. Once inserted into locator blocks 23, segregation baffle 12 is attached to the top edge of plates 20 to insure the proper 0.250 inch spacing of separation 36 between plates 20 at the upper edge.

Still referring to FIG. 4, the upper edge of grid 22 is maintained in position against plate 20 at all times by the insertion of "U"-shaped screen retainers 27. Retainers 27 are of stainless steel and spring bias the top edge of two opposing grids 22 against their associated plates 20 to insure proper 0.250 inch spacing of separation 36 between plates 20 at the upper edge of grids 22. On either terminal end of cell 9 a modified retainer 27 is frictionally captured by a notch in segregation baffle 12 to secure the terminal grid 22 of either end of cell 9 against plate 20.

While grid 22 is securely held in place by clips 25, it is preferred, for the efficiency of cell 9, that clips 25 and buss bar 29a, 29b (FIG. 1) be positioned less than 2 inches above locator blocks 23a, 23b. This then places clips 25 in the lower half of grid 22 and maintains a large unobstructed path for gas flow through cell 9. In practice, the selected length of arm 26 of clip 25 places "V" shaped bend 26 in the lower, outside quadrant of grid 22. Therefore, it is preferred to insure contact between plate 20 and the upper edge of grid 22 through the additional biasing of grid retainer 27.

Referring again to FIG. 1, bus bars 29a, 29b are shown supported by flanges 30 which are attached to locator block 23. Power connector 31 extends from the outside of bus bar 29a, 29b to permit attachment of the positive and negative power cables (not shown). Cell 9, once assembled, is attached to insulator 19 which is made of glass in the preferred embodiment. Insulator 19 is then attached to base plate 17. Insulator 19 serves to isolate all electrical components of cell 9 from contact with container 15.

To avoid $O_3$ decomposition of the power cables and their insulation which is exposed to the elevated $O_3$ atmosphere of generation chamber 11, the power cable is encapsulated within a fluorocarbon polymer jacket such a TEFLON® tubing. The TEFLON® covered power cables are then introduced into generation chamber 11 through apertures 42, 44 (FIG. 2). The power cables are secured in place within apertures 42, 44 by ozone-resistant fluorocarbon compression fittings (not shown) which are screwed into apertures 42, 44. After the power cable has been inserted into the fitting, the fitting is tightened to compress it about the TEFLON cable covering. This then provides an air-tight closure about the cable which is resistant to attack by $O_3$ while preventing escape of $O_3$ from generation chamber 11.

The present inventive combination functions in the manner of a corona discharge ozone generator, but with a higher efficiency of ozone production per unit of energy introduced into cell 9. In operation, a positive power lead is attached to power connector 31 of bus bar 29a and a negative power lead is attached to power connector 31 of bus bar 29b. This creates the requirements for corona discharge of two oppositely charged electrodes separated by a dielectric material with space for gas flow. The waffle shaping of mesh grids 22 allows the introduced gas to perfuse between the electrodes and the dielectric. The system is then charged with approximately 4000 volts at 60 cycles which is sufficient to induce current to flow through dielectric 20 resulting in corona formation and dissociation of $O_2$ and formation of ozone $O_3$.

In operation, air or dried air may be used, however it is preferred that oxygen enriched air be introduced into gas entry port 16 at a sufficient rate to provide a slight back-pressure of at least 1 inch water column pressure with the gas flow through separation 36 between plates 20 being 10–12 cubic feet/hour. The molecular oxygen ($O_2$) present in the gas contacts the corona discharge of proximate to voids 34 of grids 22 where the conversion to ozone occurs according to the following equation:

$$O_2 \rightarrow 2O$$

$$O + 2O + M \rightarrow O_3 + M$$

First, the molecular oxygen is converted to two oxygen atoms followed by some of the oxygen atoms attaching themselves to available oxygen molecules with the excess energy in the newly formed ozone being carried off by any available molecule (M) of gas. The formed ozone then passes out of cell 9 and is carried out of generation chamber 11 through gas exit port 18 by the gas stream.

The exiting gas has been enriched in ozone by approximately 2.0% representing a production rate of 0.5 pounds of $O_3$ per day. This is accomplished while using only 0.75 amps to produce the 0.5 pounds of ozone or 0.70 lbs/amp. By contrast, currently available corona discharge generator devices consume 3.5 amps to generate 0.84 pounds of ozone or 0.24 lbs/amp. Therefore, the inventive combination offers a nearly 300% increase in $O_3$ production while consuming an equivalent amount of power. This represents a daily reduction in power consumption of approximately 80% for production of an equivalent amount of ozone.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

It is also to be understood that the following claims are intended to cover all of the generic and specific features of the invention herein described, and all statements of the scope of the invention which, as a matter of language, might be said to fall therebetween Particularly, it is to be understood that in the claims, ingredients or compounds recited are intended to include compatible mixtures of such ingredients.

What I claim as new and desired to secured by Letters Patent is as follows:

1. A corona discharge ozone generation apparatus enclosed within a container comprising:

a electric plate, having a first face and a second face, means extending from the container to contact an upper surface of said dielectric plates to bilaterally divide the space within the container into first and second areas for directing of said oxygen-containing gas flow through the generator and for reducing reverse-flow of said gas within the container, first and second electrodes, said electrodes comprised of an ozone-resistant wire mesh void-containing grid to permit perfusion of an introduced gas within said grid-voids, a first clip for spring biasing said first electrode against said dielectric plate first face, said clip being capable of providing a positively charged current to said first electrode, and a second clip for spring biasing a second electrode against said dielectric plate second face, said clip being capable of providing a negatively charged current to said second electrode, such that upon application of positive current to said first clip and negative current to said second clip a corona discharge is generated proximate to said dielectric and said electrode grid-voids to accomplish production of ozone in an oxygen-containing gas passing across said dielectric first and second faces.

2. The apparatus as claimed in claim 1 wherein said dielectric plate provides a separation between said first and second electrodes greater than 0.02 inches and less than 0.80 inches.

3. The apparatus as claimed in claim 1 wherein said electrode comprises a stainless steel mesh grid of less than 4 inches length on each side.

4. In an air-cooled corona discharge ozone generator within a container the improvement comprising:

at least first, second and third opposed, spaced-apart dielectric plates each plate having a first face and a second face, a baffle having a longitudinal axis orthogonal to said plate faces and extending upwardly from an upper edge of said plate to contact the container to divide the container interior to direct flow of an oxygen-containing gas past said plate faces and to reduce reverse-flow of said gas across said plate upper edge, at least first, second, third and fourth electrodes, each electrode comprised of an ozone-resistant wire mesh void-containing grid to permit perfusion of an introduced gas within said grid-voids, a first conductive bar having at least one arm extending therefrom, said arm having a generally v-shaped bend thereon for spring biasing said first electrode against said first plate second face and for spring biasing said second electrode against said second plate first face, said arm allowing conduction of a positively charged current from said first bar to said first and second electrodes, and a second conductive bar having at least one arm extending therefrom, said arm having a generally V-shaped bend thereon for spring biasing said third electrode against said second plate second face and for spring biasing said fourth electrode against said third plate first face, said arm allowing conduction of a negatively charged current from said second bar to said third and fourth electrodes, such that upon application of a positive current to said first bar said positive current is conducted to said first and second electrodes and upon application of a negative current to said second bar said negative current is conducted to said third and fourth electrodes for generation of a corona discharge proximate to said second plate and said second and third electrode grid-voids to accomplish production of ozone in an oxygen-containing gas passing across said second plate first and second faces.

5. The generator as claimed in claim 4 wherein said dielectric plates provide a separation between said electrodes biased against said plate first and second faces of greater than 0.02 inches and less than 0.080 inches.

6. The generator as claimed in claim 4 wherein said electrodes comprises a stainless steel mesh grid of less than 4 inches length on each side.

7. In an air-cooled corona discharge ozone generator the improvement comprising:

a container, including a lid, for enclosing said generator, a dielectric plate having first and second faces, said plate thickness being greater than 0.02 inches and less than 0.80 inches, a baffle having a longitudinal axis orthogonal to said plate faces and extending upwardly from an upper edge of said plate to contact said container lid to divide said container interior to direct flow of an oxygen-containing gas past said plate faces and to reduce reverse-flow of said gas across said plate upper edge, first and second electrodes, each electrode comprised of an ozone-resistant wire mesh void-containing grid to permit perfusion of an introduced gas within said grid-voids, a first electrically conductive bar having a first electrically conductive arm spring mounted thereon, said arm spring biasing said first electrode against said plate first face, and a second electrically conductive bar having a second electrically conductive arm spring mounted thereon, said arm spring biasing said second electrode against said plate second face, such that upon application of a positive current to said first bar said positive current is conducted to said first electrode and upon application of a negative current to said second bar said negative current is conducted to said second electrode for generation of a corona discharge proximate to said plate and said electrode grid-voids to accomplish production of ozone in an oxygen-containing gas passing across said second plate first and second faces.

* * * * *